US008118252B2

(12) United States Patent
Dumont et al.

(10) Patent No.: US 8,118,252 B2
(45) Date of Patent: Feb. 21, 2012

(54) REAR LOWER AERODYNAMIC FAIRING FOR THE ATTACHMENT DEVICE OF AN AIRCRAFT ENGINE

(75) Inventors: Jean-Francois Dumont, Thil (FR); Frederic Roche, Bretx (FR)

(73) Assignee: Airbus Operations SAS, Toulouse (FR)

( * ) Notice: Subject to any disclaimer, the term of this patent is extended or adjusted under 35 U.S.C. 154(b) by 358 days.

(21) Appl. No.: 12/528,646

(22) PCT Filed: Mar. 13, 2008

(86) PCT No.: PCT/EP2008/052985
§ 371 (c)(1),
(2), (4) Date: Aug. 26, 2009

(87) PCT Pub. No.: WO2008/113737
PCT Pub. Date: Sep. 25, 2008

(65) Prior Publication Data
US 2010/0051743 A1    Mar. 4, 2010

(30) Foreign Application Priority Data

Mar. 16, 2007    (FR) ..................................... 07 53890

(51) Int. Cl.
*B64D 27/00*    (2006.01)
(52) U.S. Cl. .......... 244/54; 244/130; 248/554; 248/555; 248/556; 248/557; 60/796; 60/797

(58) Field of Classification Search .................... 244/54, 244/130, 131; 248/554, 555, 556, 557; 60/796, 60/797
See application file for complete search history.

(56) References Cited

U.S. PATENT DOCUMENTS

| 4,238,092 | A | * | 12/1980 | Brennan | 244/54 |
| 4,466,587 | A | * | 8/1984 | Dusa et al. | 244/121 |
| 4,712,750 | A | * | 12/1987 | Ridgwell | 244/117 A |
| 5,524,846 | A | * | 6/1996 | Shine et al. | 244/53 R |
| 5,906,097 | A | * | 5/1999 | Hebert et al. | 60/226.1 |
| 2003/0201366 | A1 | * | 10/2003 | Connelly et al. | 244/121 |

* cited by examiner

*Primary Examiner* — Timothy D Collins
*Assistant Examiner* — Michael A Fabula
(74) *Attorney, Agent, or Firm* — Oblon, Spivak, McClelland, Maier & Neustadt, L.L.P.

(57) ABSTRACT

A rear lower aerodynamic fairing for an attachment device for an aircraft engine, including two side panels assembled together with transverse stiffening inner ribs spaced apart from each other along a longitudinal direction of the fairing, and a heat protection floor to be closely followed by a primary flow of the engine. The floor includes plural floor segments distributed along the direction and non-rigidly bound to each other, and the fairing further includes an assembling mechanism assembling the floor segments, offsetting the latter of the ribs to which are connected the assembling mechanism.

18 Claims, 3 Drawing Sheets

REAR LOWER AERODYNAMIC FAIRING FOR THE ATTACHMENT DEVICE OF AN AIRCRAFT ENGINE

TECHNICAL FIELD

The present invention relates to a rear lower aerodynamic fairing for an aircraft engine attachment device intended to be interposed between an aircraft wing and the relevant engine, this fairing being also called <<shield>> or <<APF>> (<<Aft Pylon Fairing>>).

The invention may be used on any type of aircraft equipped with turbojet or turboprop engines.

With the type of mounting device, also called an engine mounting pylon or <<EMS>> (<<Engine Mounting Structure>>), a turbine engine may be hung from below the wing of the aircraft, or else this turbine engine may be mounted above this same wing.

STATE OF THE PRIOR ART

Such an attachment device is actually provided for forming the connection interface between a turbine engine and a wing of the aircraft. It allows the forces generated by its associated turbine engine to be transmitted to the structure of this aircraft, and also allows transport of fuel, of electric, hydraulic systems and air between the engine and the aircraft.

In order to ensure transmission of the forces, the attachment device includes a rigid structure also called a primary structure, often of the <<structure box>> type, i.e. formed by the assembly of upper and lower spars and of side panels connected together via transverse stiffening ribs.

On the other hand, the device is provided with attachment means interposed between the turbine engine and the rigid structure, these means globally including two engine ties, as well as a device for spreading the thrust forces generated by the turbine engine. In the prior art, the load-spreading device usually comprises two side connecting rods connected to a rear portion of the fan casing of the turbine engine on the one hand and to a rear tie attached on the central case of the latter on the other hand.

In the same way, the attachment device also includes another series of ties forming a mounting system interposed between the rigid structure and the wing of the aircraft, this system usually consisting of two or three ties.

Moreover, the pylon is provided with a plurality of secondary structures ensuring the segregation and hold of the systems while supporting aerodynamic fairing elements, the latter generally assuming the shape of assemblies of panels added onto the structures. In a way known to one skilled in the art, the secondary structures differ from the rigid structure by the fact that they are not intended to ensure transfer of the forces from the engine and which have to be transmitted towards the wing of the aircraft.

Among the secondary structures, the rear lower aerodynamic fairing also called APF is included, which has a plurality of functions among which the formation of a heat or anti-fire barrier and the formation of aerodynamic continuity between the outlet of the engine and the attachment pylon are noted.

The rear lower aerodynamic fairing generally assumes the shape of a structural box comprising two side panels assembled together by inner transverse stiffening ribs spaced apart from each other along a longitudinal direction of the fairing as well as a heat protection floor. It is specified that this structural box is not usually closed as opposed to the heat protection floor, i.e. in the upper portion when the engine is intended to be hung from under the wing of the aircraft, given that it is at this location that it will be connected on the other structures of the pylon.

The heat protection floor is provided with an outer surface intended to be closely followed by a primary flow of the engine which it delimits, while the side panels are provided in order to be closely followed outwardly by a secondary flow of the engine, due to their implantation in the annular secondary flow channel of the engine, and/or at the outlet of the latter.

In the solutions of the prior art, the heat protection floor is fixedly mounted on the inner transverse ribs of the structural box in contact of which it is found, and its opposite side ends are fixedly mounted on both side panels, respectively, which also closely follow the transverse ribs.

In this configuration, the heat protection floor is in contact with the primary flow of a very high temperature, which leads it to strongly deform by thermal expansion. However, its respective recessed fittings in the inner transverse ribs and in the lower end of each of one two side panels generate strong thermomechanical stresses within this floor which of course is detrimental for the latter.

It is noted that this phenomenon of introduction of strong thermomechanical stresses due to the significant thermal expansion of the floor is more pronounced by the fact the side panels bathe in the relative cold secondary flow, so that they only undergo very little deformation by thermal expansion. Nevertheless, they however encounter substantial deformation caused by the application of stresses resulting from the expansion of the floor to which they are directly and rigidly connected, which leads to degradation of their aerodynamic shape, and which, more generally, causes deterioration of the overall aerodynamic quality of the fairing. Naturally, such a degradation is a penalty in terms of the generated parasitic drag.

As such, it is specified that the aerodynamic quality of the fairing is also degraded by the localized deformations of the heat protection floor which cannot expand freely, without any stress, due to its recessed fitting in certain elements of the fairing such as the inner ribs, as this was described above. As the primary flow is a very fast jet, the localized deformations encountered at the floor actually produce a substantially large parasitic drag.

Finally, it is noted that the inner transverse ribs, which are not directly closely followed by the substantially fresh secondary flow because of their localization inside the structural box, may be sensitive to the provision of heat from the heat protection floor with which they are in contact. Thus, in order to allow them to fulfil their mechanical holding function for the different elements of the fairing in the form of a structural box, it may be necessary to resort to overdimensioning of these ribs and/or to the use of costly materials having good heat resistance properties for their manufacturing.

OBJECT OF THE INVENTION

The object of the invention is therefore to find a remedy at least partly to the aforementioned drawbacks relating to the achievements of the prior art.

To do this, the object of the invention is a rear lower aerodynamic fairing for an attachment device for an engine, intended to be interposed between an aircraft wing and the engine, the fairing forming a structural box comprising two side panels assembled together by inner transverse stiffening ribs spaced apart from each other along a longitudinal direction of the fairing, and further including a heat protection floor provided with an outer surface intended to be closely followed by a primary flow of the engine.

According to the invention, the heat protection floor consists of several floor segments distributed along the longitudinal direction and not rigidly bound to each other. Further, the rear lower aerodynamic fairing further includes means for assembling floor segments, offsetting the latter from the inner transverse stiffening ribs to which these same assembling means are connected.

One of the particularities of the present invention lies in the fact that this floor is presently offset from the inner transverse ribs with assembling means provided for this purpose, it being understood that these are the same assembling means which ensure, preferably by themselves, the assembling of the floor segments on the ribs. In other words, the segmented floor is no longer applied against the ribs, which advantageously allows it to deform more freely by thermal expansion as a result of the significant heat evolved by the primary flow closely following this floor.

This original configuration in which the floor is therefore substantially free as regards the inner ribs provides a considerable reduction in the thermomechanical stresses experienced by the floor as a result of such an expansion, as compared with those experienced in prior embodiments in which the main factor for introducing thermomechanical stresses in the floor was formed by the recessed fitting of the latter in the ribs.

In this respect, given that the floor is capable of deforming by thermal expansion while encountering less stresses than before, the localized deformations degrading the aerodynamic quality of this floor are consequently also strongly reduced. The result of this is therefore an improvement in the overall aerodynamic quality of the fairing, by substantially reducing the effects of parasitic drag and thereby improving the performance/consumption ratio of the aircraft.

The aforementioned beneficial effects are advantageously pronounced by the segmentation of the floor into several floor segments distributed along the longitudinal direction and non-rigidly bound to each other. This is explained by the reduction of the thermal expansion encountered at the segments which have reduced length as compared with the total length of the floor, and also by the fact that the non-rigid links provided between the segments allow the latter to move relatively to each other during the expansion phase without generating a too large mechanical stress.

Preferably, the offset segmented floor of the inner ribs is entirely without any contact with the latter, so that the heat transmitted to these ribs through the floor first passes through the assembling means. This allows the heat to lose intensity before attaining the inner ribs, which are therefore only weakly thermally activated, notably advantageously involving the possibility of using materials other than the more expensive ones having good heat-resistance properties, without however requiring overdimensioning of these ribs.

Further, by the presence of only slightly expanding inner ribs, the rear lower aerodynamic fairing may be integrated to other secondary structures or the pylon, like the rear structure.

Preferably, any two floor segments directly consecutive in the longitudinal direction are laid out edge to edge. Preferentially it is proceeded in such a way that these edges are flush, in order to provide aerodynamic continuity between both floor segments.

Preferably, two longitudinal aerodynamic junction web segments are associated with each floor segment, both of these segments each having a first side end fixedly mounted on either one of the two side ends of said associated floor segment, and a second side end laid out in proximity to either one of both side panels respectively. Therefore, both longitudinal webs formed by the aforementioned segments, laid out on either side of the latter, allow aerodynamic continuity to be ensured between each side ends of the floor segment and the associated side panel, added on the inner ribs. In this respect, it is noted that the presence of longitudinal webs allows the rigidity of the heat protection floor to be reinforced. This specificity, added to the different advantageous technical effects discussed above, gives the possibility of contemplating reduction in the thickness of the floor relative to that encountered in the prior art, which is in particular expressed by gains in terms of mass and of costs.

Preferentially, in any transverse segment of the fairing, the first end of each longitudinal web segment and its associated heat protection floor segment side end form together a tip, preferably in one form of a Y. In other words each longitudinal web segment is such that its first side end is pressed against and in contact with its associated floor segment side end, before gradually moving away from this same floor by moving towards its second side end located in proximity to the inner ribs and the side panels, for aerodynamic continuity with the latter.

This preferred tip shape advantageously gives the possibility of retaining an effective separation between the primary flow flowing under the floor and the secondary flow closely following the side panels, so that the latter are not exposed to the significant heat of the primary flow.

Preferably always in any transverse segment of the fairing, each longitudinal web segment and the heat protection floor segment each substantially assume the shape of a line forming a curve opening outwards relatively to said fairing, this shape being notably perfectly adapted so as to ensure proper aerodynamic flow of the primary flow.

Still preferentially, the longitudinal web segments and the heat protection floor segments are made in aluminium or in a composite material formed by a mixture of resin and of carbon and/or glass fibers, which generate gains in terms of mass and of costs. Nevertheless, they may also be made in titanium, especially as regards the most exposed heat protection floor segments to the primary flow, without departing from the scope of the invention.

Preferably, the assembling means are fixedly mounted on a lower portion of the inner transverse stiffening ribs, at a distance from the side panels which, as for them, are preferentially fixedly mounted on side portions of these same inner transverse ribs.

More generally, the heat protection floor segments and the longitudinal web segments are without any direct rigid mechanical link with the side panels of the fairing, which means that the latter panels are exclusively fixedly added indirectly onto the heat protection floor and both longitudinal webs, in this case via inner transverse ribs and aforementioned assembling means.

In this configuration, the floor is substantially free as regards the side panels, which contributes to further decreasing the thermomechanical stresses, experienced by the latter as a result of a deformation by thermal expansion.

Here again, given that the floor is able to deform by thermal expansion by encountering less stresses than before, notably because of its segmented character, consequently the aerodynamic quality of this floor is also strongly increased.

Further, it is all the more increased since the absence of any recessed fitting of the segmented floor in the side panels advantageously avoids stressing and deformation of these side panels which may likely occur as a result of the deformation by thermal expansion of the floor. In this respect, it is specified that the side panels bathe in the relatively cold secondary flow, so that they only undergo very little deformation by thermal expansion. Thus their overall deformation level is therefore maintained relatively low, which induces very satisfactory aerodynamic quality, involved in reducing the parasitic drag effects and improving the performance/consumption ratio of the aircraft.

Always in order to minimize aerodynamic perturbations and the parasitic drag which results from the latter, each of the two side panels is preferably made in order to form a single part, over the whole length of the fairing. Thus, this solution contrasts with the one aiming at providing longitudinally segmented side panels, capable of generating the formation of plays and of significant mismatches between the different segments which make them up. Nevertheless, it is possible to produce each side panel in one single piece with several longitudinal segments which are rigidly/fixedly added to each other, without departing from the scope of the invention.

Similarly, each of the two side panels is preferably made in aluminium or in a composite material formed by a mixture of resin and or carbon and/or glass fibers.

Preferably the assembling means include a plurality of attachment devices each comprising:
a first recessed fixture on one of the inner transverse ribs,
a second recessed fixture on a given floor segment,
a third recessed fixture on a floor segment adjacent to the given floor segment, and
a connecting axis crossing the first, second and third fixtures.

Thus, it is preferentially provided that a same attachment device borne by one of the inner ribs, should simultaneously be used for connection to this rib of two adjacent floor segments in the longitudinal direction. In such a case, it is the attachment device which participates in making a non-rigid mechanical link between both relevant segments.

In this respect, preferentially, for each attachment device, at least one of the two links among the one between the second fixture and the connecting axis, and the one between the third fixture and the connecting axis, allows a relative displacement of both relevant elements along a direction of the connecting axis. The relative displacement indicated above, even if it is provided as being limited in amplitude, is allowed in order to avoid the appearance of a significant mechanical stress during the heat expansion phases of the floor segments.

Actually, during these phases, the observed relative displacement(s) in fact stem from a relative displacement between both adjacent floor segments which expand. It is noted that the edge-to-edge assembling of both floor segments is achieved in such a way that the flush junction is retained even after their relative displacement.

Preferably, for each attachment device, the connecting axis is oriented substantially along the longitudinal direction.

Still preferentially, each floor segment is only mounted on two inner transverse ribs, exclusively by means of four attachment devices, including two which are borne by one of the two inner transverse ribs and the two others are borne by the other inner transverse rib. Naturally, the number and the location of the attachment devices may be adapted by one skilled in the art, depending on the encountered needs.

The object of the invention is also an attachment device for an engine, intended to be interposed between an aircraft web and the engine, this device comprising a rear lower aerodynamic fairing, as described above.

Further, the object of the invention is also an engine assembly comprising an engine such as a turbojet, and an attachment device for this engine, this device being in accordance with the one that has just been mentioned.

Finally, another object of the present invention is an aircraft comprising at least such an engine assembly.

Other advantages and features of the invention will become apparent in the non-limiting detailed description below.

BRIEF DESCRIPTION OF THE DRAWINGS

This description will be made with reference to the appended drawings wherein.

DETAILED DESCRIPTION OF PREFERRED EMBODIMENTS

Figure 1:
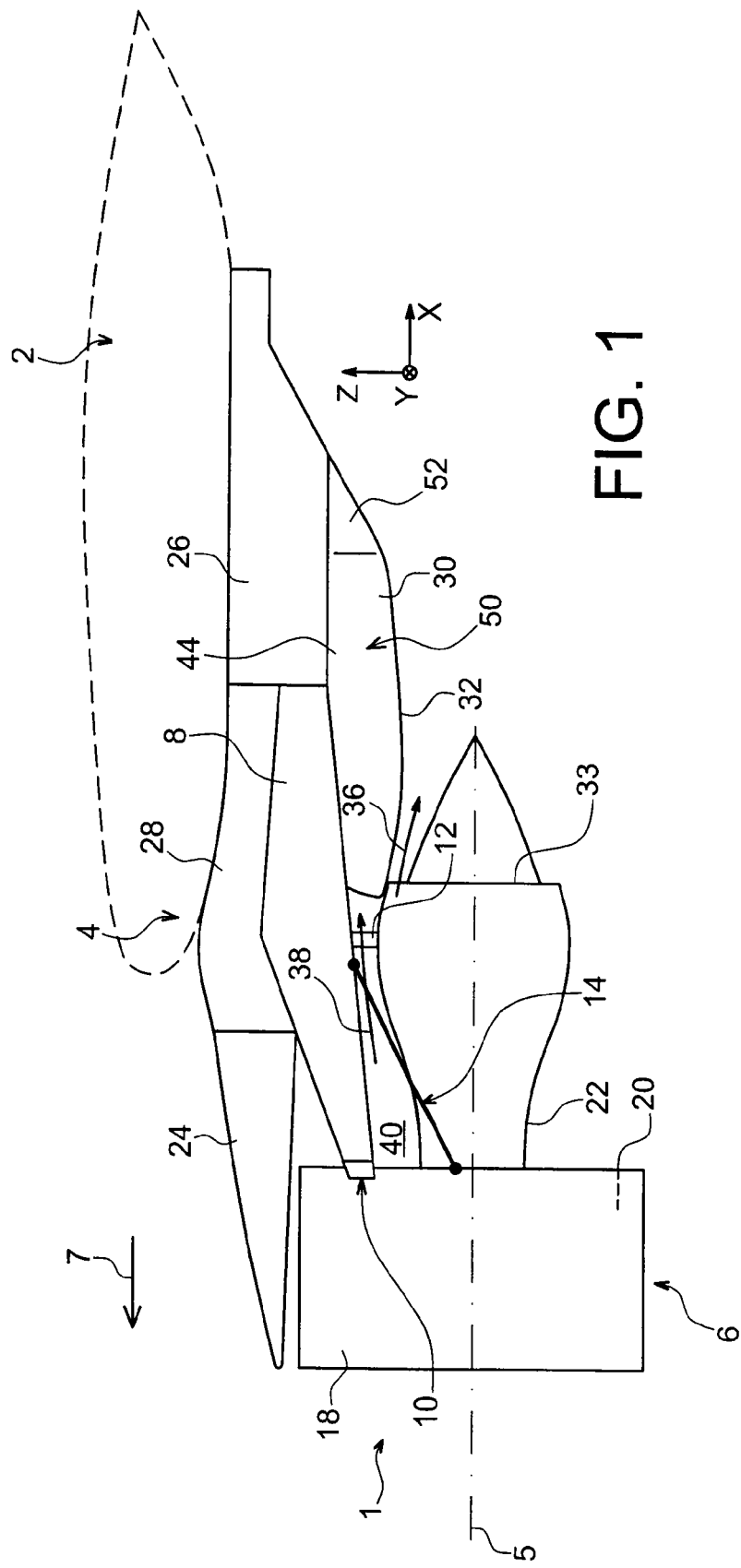
FIG. 1 illustrates a schematic side view of an engine assembly for an aircraft, comprising an attachment device according to a preferred embodiment of the present invention.

With reference to FIG. 1, an engine assembly 1 for an aircraft intended to be fixed under a wing 2 of this aircraft is seen, this assembly 1 including an attachment device 4 according to a preferred embodiment of the present invention, as well as an engine 6 such that a turbojet is hung from under this device 4.

Globally, the attachment device 4 includes a rigid structure 8, also called a primary structure, bearing attachment means for the engine 6, these attachment means having a plurality of engine ties 10, 12, as well as a device for absorbing the thrust forces 14 generated by the engine 6.

As an indication, it is noted that the assembly 1 is intended to be surrounded with a pod (not shown) and that the attachment device 4 includes another series of ties (not shown) added onto the rigid structure 8 and with which suspension of this assembly 1 may be ensured under the wing 2 of the aircraft.

In all the description which follows, by convention, the longitudinal direction of the device 4 is called X which may also be assimilated to the longitudinal direction of the turbojet 6 and to that of the rear lower aerodynamic fairing which will be shown hereafter, this direction X being parallel to a longitudinal axis 5 of this turbojet 6. On the other hand, the direction oriented transversely with respect to the device 4 is called Y and may also be assimilated to the transverse direction of the turbojet 6 and to that of the rear lower aerodynamic fairing and Z is the vertical direction or direction of the height, these three directions X, Y and Z being orthogonal to each other.

On the other hand, the terms <<front>> and <<rear>> are to be considered with respect to a direction of forward movement of the aircraft encountered as a result of the thrust exerted by the turbojet 6, this direction being schematically illustrated by the arrow 7.

In FIG. 1, both engine ties 10, 12 may therefore be seen, the device for absorbing the thrust forces 14, the rigid structure 8 of the attachment device 4, as well as a plurality of secondary structures added onto the rigid structure 8. These secondary structures ensuring segregation and hold of the systems while supporting aerodynamic fairing elements will be described hereafter.

It is indicated that the turbojet 6 has at the front of a fan casing 18 of large size delimiting an annular fan channel 20, and including towards the rear a central case 22 of smaller size, containing the core or this turbojet. The casings 18 and 22 are of course interdependent on each other.

As this may be seen in FIG. 1, the engine ties 10, 12 of the device 4 are provided as two in number, and respectively called front engine tie and rear engine tie.

In this preferred embodiment of the present invention, the rigid structure 8 assumes the shape of a structural box extending from the rear towards the front, substantially along the direction X.

The structural box 8 then assumes the shape of a pylon with a design similar to that usually observed for attachment pylons of turbojets, notably in this sense that it is provided with transverse ribs (not shown) each assuming the shape of rectangle oriented in an YZ plane.

The attachment means of this preferred embodiment first of all include the front engine tie 10 interposed between a front end of the rigid structure 8 also called a pyramid, and an upper portion of the fan casing 18. The front engine tie 10 is designed in a standard way and is known to one skilled in the art.

On the other hand, the rear engine tie 12, also made in a standard way and known to one skilled in the art, is, as for it, interposed between the rigid structure 8 and the central case 22.

Still with reference to FIG. 1, a front aerodynamic structure 24, a rear aerodynamic structure 26, a fairing 28 for connecting front and rear aerodynamic structures and a rear lower aerodynamic fairing 30 are included among the secondary structures of the pylon 4.

Globally, the secondary structures are conventional elements identical or similar to those encountered in the prior art, and known to one skilled in the art, except for the lower aerodynamic fairing 30 which will be detailed below.

More specifically, the front aerodynamic structure 24 is placed in the lower front extension of the wing 2 and above the primary structure 8. It is fixedly mounted on the rigid structure 8, and has an aerodynamic profile function between an upper portion of the fan cowls jointed on the latter, and the leading edge of the wing. This front aerodynamic structure 24 then not only has an aerodynamic fairing function but also allows placement, segregation and transport of various systems (air, electric, hydraulic systems, fuel). Further, as the front portion of this structure 24 is not in contact with the rigid structure 8, a heat exchanger is usually interposed in the space defined between both of these elements.

Directly in the rear extension of this structure 24, still under the wing and mounted above the structure, is found the connecting fairing 28 also called <<karman>>. Next, still towards the rear, the connecting fairing 28 is extended with the rear aerodynamic structure 26, which contains the major portion of hydraulic equipment. This structure 26 is preferably entirely located in the rear relatively to the rigid structure 8, and is therefore attached under the wing of the aircraft.

Finally, under the rigid structure 8 and the rear aerodynamic structure 26, is found the rear lower aerodynamic fairing 30, also called <<shield>> or <<Aft Pylon Fairing>>. Its essential functions are formation of a heat barrier also called an anti-fire barrier used for protecting the pylon and the wing from the heat evolved by the primary flow, and formation of an aerodynamic continuity between the outlet of the engine and the attachment pylon.

The aforementioned fairing 30 includes a heat protection floor 32 provided with an outer surface intended to be closely followed by a primary flow of the engine which partly delimits radially outwards this primary flow escaping from the nozzle 33 of the engine, being schematically illustrated by the arrow 36. Moreover, the fairing 30 also includes two side panels 44 which are as for them provided in order to be closely followed on the outside by a secondary flow of the engine schematically illustrated by the arrow 38, because of their implantation in the annular channel 40 of the secondary flow of the engine, and/or at the outlet of the latter.

It is noted that in the described preferred embodiment, wherein the engine 6 is intended to be hung from under the wing of the aircraft, the floor 32 of the pylon and of the wing for heat protection against the primary flow 36, is a lower portion of the fairing 30. Naturally, this floor would form an upper portion of the fairing in the alternative case when the engine would be intended to be implanted above the wing.

Finally, as this is visible in FIG. 1, provision is made for having the front end of the floor 32 fit the upper rear end of the nozzle 33 or else it is brought very close to this same rear nozzle end 33.

With reference now to FIGS. 2-5, the rear lower aerodynamic fairing 30 may be seen in more detail, which assumes the general shape of a structural box open upwards, i.e. in the direction of the other structures of the pylon 4 on which it is intended to be mounted, i.e. the rear aerodynamic structure 6 and the rigid structure 8. The fairing 30 preferably has a plane of symmetry P corresponding to an XZ plane, this plane P also forming a vertical plane of symmetry for the whole of the attachment device 4, and for the engine 6.

The rear lower aerodynamic fairing 30 in the shape of a structural box, comprises the two side panels 44, each roughly oriented in an XZ plane, on either side of the plane P. They are assembled together by inner transverse stiffening ribs 46 spaced apart from each other along the X direction, each of these ribs 46 being oriented along an YZ plane and for example assuming the shape of a rectangle or a square.

The side panels 44 are each made so as to form only a single part, preferably over the whole length of the fairing. Nevertheless, this single part may be made by assembling several elements added rigidly to each other, without departing from the scope of the invention. They are fixedly and directly mounted on the side portions of each of the inner ribs 46 with conventional means known to one skilled in the art.

Figure 3:
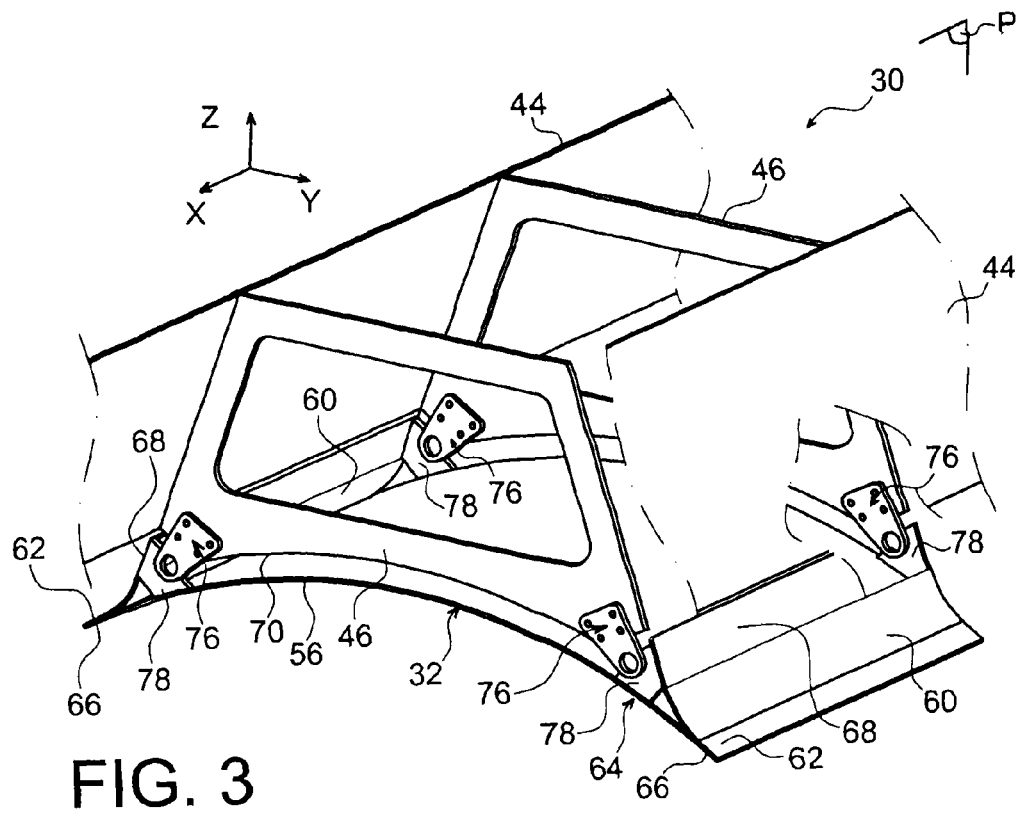
FIG. 3 illustrates a perspective view of a portion of the rear lower aerodynamic fairing shown in FIG. 2.

On the other hand, the fairing 30 integrates the hear protection floor 32 in the lower portion of the structural box, the upper portion preferably remaining open before being added onto the attachment device, as this is well visible in FIG. 3.

Figure 2:
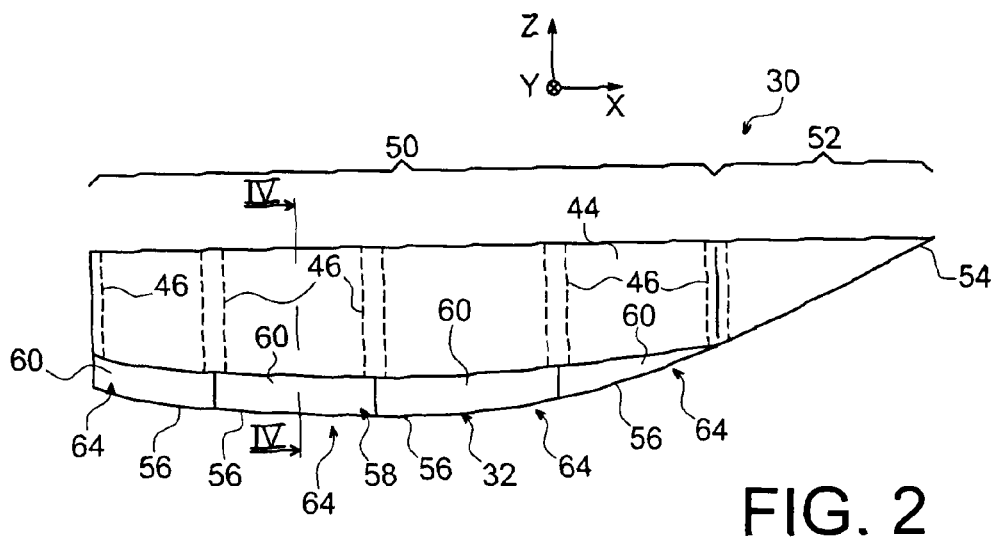
FIG. 2 illustrates a more detailed side view of the rear lower aerodynamic fairing fitting out the attachment device shown in FIG. 1, this fairing also being the object of the present invention.

In FIG. 2, it may be seen that the fairing 30 is broken down into two distinct portions but interdependent on each other, i.e. a front portion 50 forming the major portion of the fairing, for example 60-85% of the latter in terms of the length along the X direction, and a rear low portion 52 globally assuming the shape of a pyramid or a tip for which the base is rigidly connected to the front portion 50 and for which the apex 54 forms a rear end of the fairing 30. As an indication, the front portion 50 has a transverse section roughly homogenous over the whole of its length.

The side panels 44 preferably each extend as a single part from one end to the other of the fairing 30, i.e. both along the front portion 50 and along the rear portion 52. On the other hand, the heat protection floor 32 itself extends preferably only on the front portion 50 and not on the rear portion 52, even if this may be contemplated of course, without departing from the scope of the invention. This particularity is notably explained by the fact that the rear portion 52 in the form of a pyramid, gradually moves away from the axis of the engine, so that the primary flow, which anyway looses its heat intensity while flowing rearwards, causes less thermal incidence on the lower closure element of the pyramid 52.

One of the particularities of the present invention lies in the fact that the floor 32 has a segmented character along the X direction. Indeed, this heat protection floor 32 consists of several floor segments 56 placed edge to edge and distributed along the X direction, and non-rigidly bound to each other, as this will be detailed hereafter. Thus, it should be understood that the upper portion of the fairing 30, less exposed to the heat of the primary flow 36, forms a one-piece assembly with side panels 44 and transverse ribs 46, while the lower portion of the fairing 30 is segmented in order to limit thermal expansion and the resulting mechanical stresses.

Each lower portion of the fairing 30 comprises not only a floor segment 56, but also two longitudinal web segments 60 of an aerodynamic junction, respectively located on either side of the plane P. Each aforementioned lower portion therefore forms a lower module 64 closed vertically downwards by the floor segment 56 and laterally closed by the two web segments 60 made interdependent on the segment 56, respectively.

More specifically, it may be seen that each longitudinal web segment 60 has a first side end 62, or lower side end, which is fixedly and directly mounted on one of the side ends 66 of the floor 32, for example by riveting or a similar means.

Thus, it is preferably proceeded in such a way that each of the two rigid and direct mechanical junctions between both ends 66 and 62 are achieved along the relevant lower module 64, roughly following the X direction.

Figure 4:
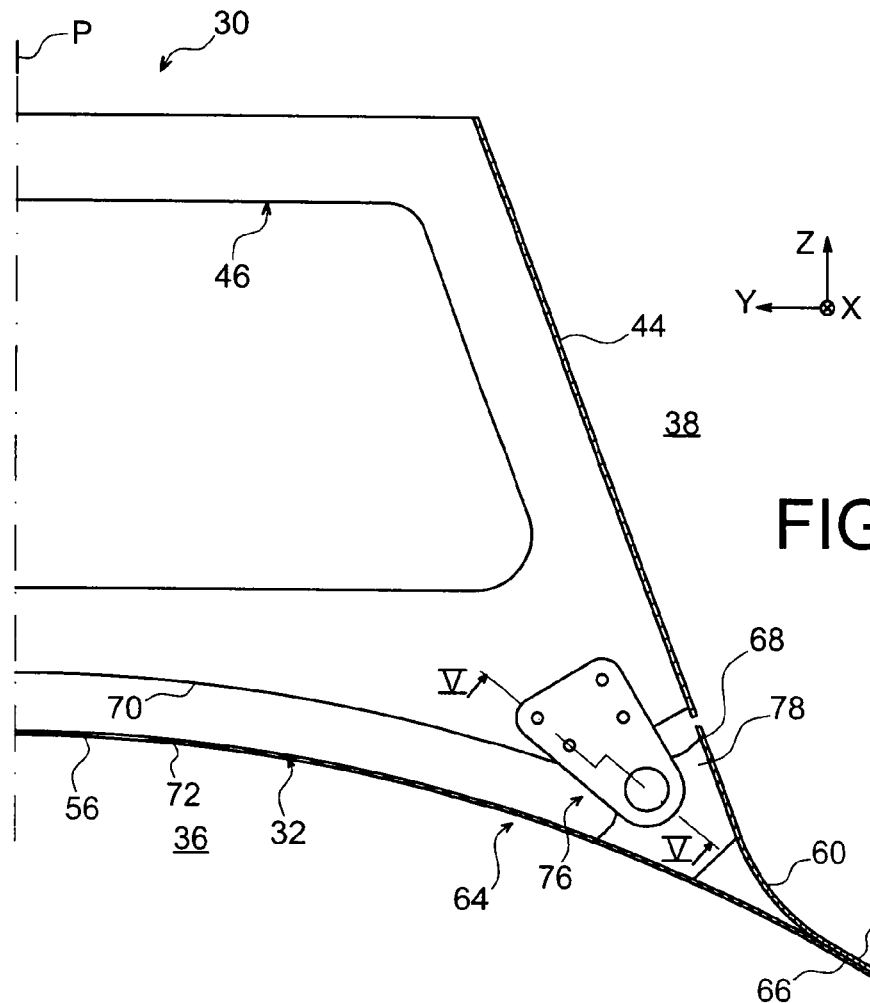
FIG. 4 illustrates a sectional half-view taken along the line IV-IV of FIG. 2.

Both longitudinal web segments 60 which extend above the floor segment 56 are each also preferably made so as to only form a single part, and extend from their lower end 62 to a second side end 68 or upper side end, the function of which is to approach as close as possible the inner ribs of the fairing 46, and especially the lower end of the side panels 44 in order to form aerodynamic continuity with the latter, as this is best visible in FIG. 4 showing a half sectional view taken between two consecutive ribs.

It may be seen on this FIG. 4 that the heat protection floor segment 56 is added indirectly on the lower portion 70 of the inner ribs 46, via assembling means which will be described subsequently, and for which one of the functions is to offset the segment 56 downwards relatively to the inner transverse ribs 46 in order to avoid direct contact with the latter. Therefore, the floor 32 is no longer directly mounted on the inner ribs as this is the case previously, which advantageously allows it to deform more freely by thermal expansion as a result of the significant heat released by the primary flow 36 closely following this floor 32.

In this respect, it is recalled that the heat protection floor 32 is provided with an outer surface referenced as 72 in FIG. 4, this surface being intended to be closely followed by the primary flow 36 which if partly delimits radially outwards, while the side panels 44 and the segments 60 are as for them provided for being closely followed outwardly by the secondary flow 38.

In order to retain an effective separation between the primary flow 36 flowing under the floor 32 and the secondary flow 38 closely following the side panels 44, i.e. in order to avoid that the primary flow with very high temperature flows up and propagates along these side panels 44, one preferably proceeds in such a way that in any transverse section of the fairing, the first end 62 of each longitudinal web segment 60 and its associated floor segment side end 66 form together a y-shaped tip. More specifically, as this has been illustrated, the Y is positioned so that its tip, i.e. its portion formed by the contact area between both ends 66, 62, is substantially oriented downwards and laterally outwardly relatively to the fairing 30, in order to properly circumscribe the primary flow 36 in the lower portion of the fairing, i.e. along and in contact with the heat protection floor 32.

As such, always in any transverse section of the fairing, provision is made so that each longitudinal web segment 60 substantially assumes the shape of a line forming a curve opening outwardly relatively to the fairing 30, while being located in the lower aerodynamic extension of the associated side panel 44 with which it forms a common surface closely followed by the secondary flow 38. In this way, the floor segment 56 located below these web segments 60 itself also substantially assumes the shape of a line forming a curve opening outwardly relatively to the fairing 30, still with the purpose of circumscribing the primary flow 36 in the lower portion of this fairing.

With this particular geometry, it is therefore easily possible to proceed in such a way that the floor 32 is entirely offset and without any contact as regards the ribs 46, a free space being therefore provided between the lower portion 70 of the latter and the floor 32.

As an indication, as shown in FIG. 2, the succession of the web segments 60 along the X direction, provided on the lower module 64, leads to the formation of two aerodynamic junction longitudinal webs 58 (only one being visible because of the side view), each without any direct rigid mechanical link with its associated side panel 44, and preferably located lower than a lower end of this panel with which it forms an aerodynamic junction.

More specifically with reference to FIG. 3, it may be seen that each lower module 64 is fixedly added onto the upper portion of the fairing 30, and more particularly on the lower portion 70 of the inner ribs 46, at a distance from the latter, with assembling means having four attachment devices 76.

Each attachment device 76 is laid out at a side and lower end of a rib 46, and at a longitudinal and side end of the lower module 64. Therefore, the four devices 76 are respectively laid out at the four corners of the module with a rough square/rectangle shape, and placed pairwise on two transverse ribs 46, preferably directly consecutive ribs.

Figure 5:
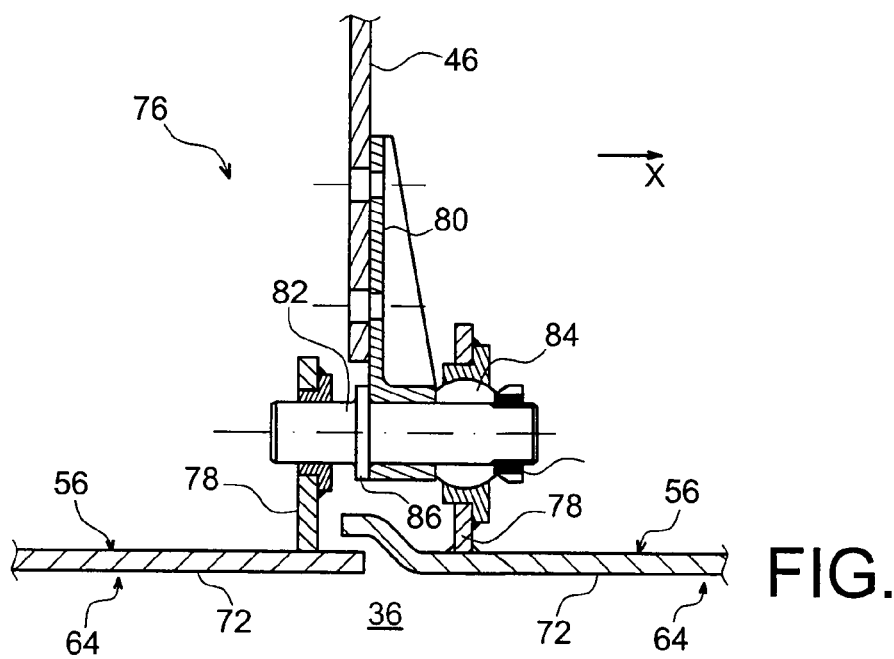
FIG. 5 illustrates a sectional view taken along the line V-V of FIG. 4.

Now referring to FIG. 5, one of the attachment devices 76 is detailed, the particularity of which is that it simultaneously ensures attachment of two consecutive lower modules 64, respectively bearing two floor segments 56 laid out edge to edge. Thus, as this will be explained hereafter, each device 76 participates in producing a non-rigid mechanical link between both adjacent segments 56.

The device 76 includes a first fixture 80, fitted on the inner transverse rib 46, preferably at a side and lower end of the latter. On the other hand, it has a second fixture 78 fitted on a given floor segment 56, designated hereafter as front segment with reference to FIG. 5, as well as a third fixture 78 fitted on a floor segment 56 adjacent to the front floor segment and designated hereafter as rear segment. As this is better visible in FIGS. 3 and 4, the fixtures 78 are laid out in substantially vertical planes and each connect the floor segment 56 to one of the two web segments 60. Further, in order to ensure the mounting of the four attachment devices 76, each lower module 64 is therefore equipped with four substantially identical fixtures 78, distributed at the four corners of this module.

In order to allow assembly of these substantially parallel fittings 80, 78, 78, a connecting axis 82 crossing these three fixtures is provided, the axis 82 being preferably oriented along the X direction.

Further, the fixture 78 of the front floor segment 56 is mounted so as to freely slide on the axis 82, which allows relative displacement of both relevant elements along the X direction. On the other hand, it is provided that the fixture 78 of the rear floor segment 56 is mounted via a ball-joint link on the axis 82, in abutment on an axis shoulder 86 preventing relative sliding movements along the X direction.

Thus, during the thermal expansion phases of the floor segments 56, during which a relative displacement is observed along the X direction between the adjacent edges of two expanding floor segments, this relative displacement is transmitted to the attachment devices 76 which in turn experience a preferential relative displacement between the fixture 78 of the front segment and the axis 82. This particular design is therefore provided in order to prevent the occurrence of significant mechanical stress during the thermal expansion phases of the floor segments 56.

During these same thermal expansion phases of the floor segments 56, the latter may also have their shape/curvature changed because of their thermal deformation along the Y direction, combined with the ensured hold in this same direction by the axes 82 on either side of each segment.

Finally, due to the particular design of the fairing 30 which has just been detailed, the whole of the constitutive elements of one latter may be made in aluminium or in a composite material formed by a mixture of resin and carbon and/or glass fibers, which advantageously generates a reduction of its mass and of its manufacturing costs. Further, the elements of the upper portion of the fairing 30 may be made in a material which is less sensitive to heat than those belonging to the lower modules 64 closer to the heat source.

Of course, various modifications may be made by one skilled in the art to the invention which has just been described, exclusively as non-limiting examples. In this respect, it may notably be indicated that if the engine assembly 1 has been shown in a configuration adapted so that it may hung from under the wing of an aircraft, this assembly 1 may also appear in a different configuration allowing it to be mounted above this same wing.

The invention claimed is:

1. A rear lower aerodynamic fairing for an attachment device for an engine to be interposed between a wing of an aircraft and the engine, the fairing forming a structural box comprising:
   two side panels assembled together with inner transverse stiffening ribs spaced apart from each other along a longitudinal direction of the fairing;
   a heat protection floor including an outer surface to be closely followed by a primary flow of the engine, wherein the heat protection floor includes plural floor segments distributed along the longitudinal direction and non-rigidly bound to each other; and
   means for assembling the floor segments, offsetting the latter from the inner transverse stiffening ribs to which are connected the means for assembling.

2. The aerodynamic fairing according to claim 1, wherein any two and directly consecutive floor segments in the longitudinal direction are laid out edge to edge.

3. The aerodynamic fairing according to claim 1, wherein two aerodynamic junction longitudinal web segments correspond to each floor segment, the two segments each having a first side end fixedly mounted on both of the two side ends of the associated floor segment, respectively, and a second side end laid out in proximity to both of the two side panels, respectively.

4. The aerodynamic fairing according to claim 3, wherein in any transverse segment of the fairing, the first end of each longitudinal web segment and its associated side end of floor segment form together a tip.

5. The aerodynamic fairing according to claim 3, wherein in any transverse section of the fairing, the first end of each longitudinal web segment and its associated side end of floor segment form together a tip in the shape of a Y.

6. The aerodynamic fairing according to claim 1, wherein in any transverse section of the fairing, each longitudinal web segment and the heat protection floor segment each substantially assume a shape of a line forming a curve opening outwards relatively to the fairing.

7. The aerodynamic fairing according to claim 3, wherein the longitudinal web segments and the heat protection floor segment are made in aluminium or in a composite material formed by a mixture of resin and of carbon and/or glass fibers.

8. The aerodynamic fairing according to claim 3, wherein the heat protection floor segments and the longitudinal web segments are without any direct rigid mechanical link with the side panels of the fairing.

9. The aerodynamic fairing according to claim 1, wherein each of the two side panels is made to form only a single part, over the whole length of the fairing.

10. The aerodynamic fairing according to claim 1, wherein each of the two side panels is made in aluminium or in a composite material formed by a mixture of resin and of carbon and/or glass fibers.

11. The aerodynamic fairing according to claim 1, wherein the heat protection floor segments are offset from the inner transverse ribs so as to be entirely without any contact with the inner transverse ribs.

12. The aerodynamic fairing according to claim 1, wherein the means for assembling includes a plurality of attachment devices each comprising:
   a first recessed fixture on one of the inner transverse ribs,
   a second recessed fixture on a given floor segment,
   a third recessed fixture on a floor segment adjacent to the given floor segment, and
   a connecting axis crossing the first, second, and third fixtures.

13. The aerodynamic fairing according to claim 12, wherein for each attachment device at least one of the two links among the one between the second fixture, at least one of the two links among the one between the second fixture and the connecting axis, and the one between the third fixture and the connecting axis, allows a relative displacement of both relevant elements along a direction of the connecting axis.

14. The aerodynamic fairing according to claim 12, wherein for each attachment device, the connecting axis is substantially oriented along the longitudinal direction.

15. The aerodynamic fairing according to claim 12, wherein each floor segment is only mounted on two inner transverse ribs, only with four attachment devices, for which two of them are borne by one of the two inner transverse ribs, and for which the two other ones are borne by the other inner transverse ribs.

16. An attachment device for an engine to be interposed between a wing of an aircraft and the engine, comprising a rear lower aerodynamic fairing according to claim 1.

17. An engine assembly comprising an engine and an attachment device for the engine according to claim 16.

18. An aircraft comprising at least one engine assembly according to claim 17.

* * * * *